R. COPELAND.
METALLIC PACKING FOR PISTON AND LIKE RODS.
APPLICATION FILED OCT. 14, 1911.
1,034,425.
Patented Aug. 6, 1912.
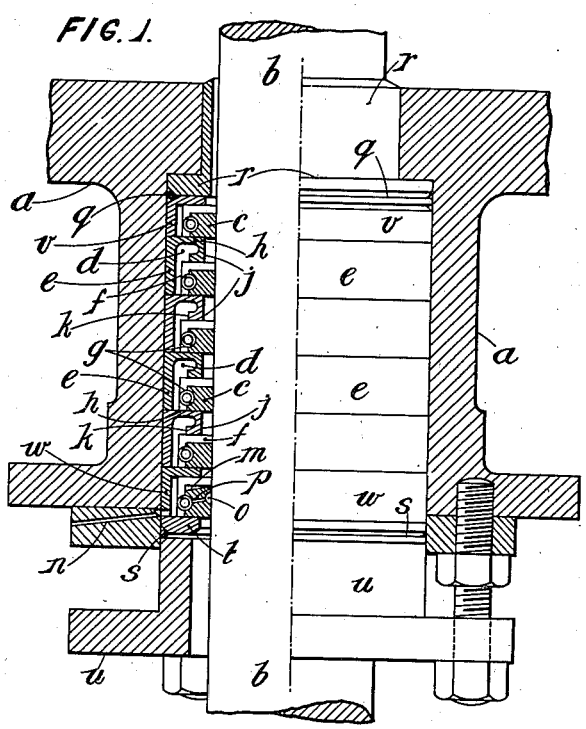
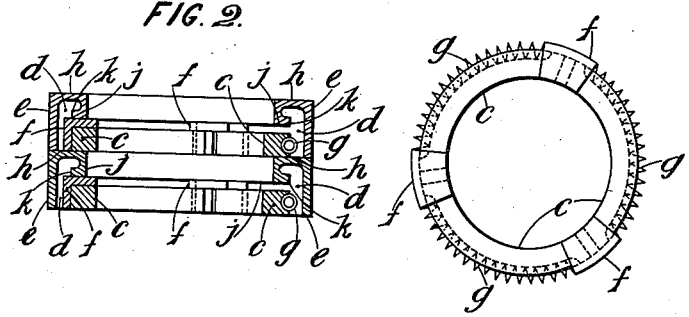
WITNESSES:
INVENTOR:
Ridley Copeland
BY
ATTY

UNITED STATES PATENT OFFICE.

RIDLEY COPELAND, OF WALLSEND, ENGLAND.

METALLIC PACKING FOR PISTON AND LIKE RODS.

1,034,425.  Specification of Letters Patent.  Patented Aug. 6, 1912.

Application filed October 14, 1911. Serial No. 654,631.

*To all whom it may concern:*

Be it known that I, RIDLEY COPELAND, a subject of the King of Great Britain and Ireland, residing in Wallsend-on-Tyne, in the county of Northumberland, England, have invented certain new and useful Improvements in or Relating to Metallic Packing for Piston and Like Rods, of which the following is a specification.

This invention relates to metallic packing for piston and like rods, and has special reference to packing of the type in which the packing rings, formed in sections and held together by springs which press them against the rod to be packed, are disposed in or between stuffing box rings and in which the fluid pressure forces the rings axially toward one end of the stuffing box and laterally against the rod, and the invention has for its object to provide an improved packing of this kind and particularly to provide an improved form of stuffing box ring which will insure a better joint between such rings and the packing rings.

According to this invention the stuffing box rings are formed with raised or projecting annular seats against which the segmental packing rings or the clamping or connecting members thereof take a narrow central bearing so as to leave the packing rings free to make a good joint with the adjacent faces of the adjoining stuffing box rings, and said annular seats are provided with extended flanges or rims.

I will fully describe my invention with reference to the accompanying drawings wherein—

Figure 1 is a section through a stuffing box fitted with one form of my improved packing which is shown partly in section and partly in elevation; Fig. 2 is a section of two stuffing box rings and two packing rings; and Fig. 3 is a plan of one of the packing rings.

Referring to the drawings $a$ is the stuffing box and $b$ the piston or other rod passing therethrough, and $c$—$c$ are packing rings arranged in chambers $d$—$d$ formed by rings $e$—$e$ assembled in the stuffing box $a$. The packing rings $c$—$c$ are made in segments secured together by clamping or junction pieces $f$—$f$ and springs $g$—$g$. The clamping or junction pieces $f$—$f$ are of L-section, and are arranged at the junctions of the segments of the rings $c$—$c$ with their horizontal components overlapping the upper faces of the ends of the sections, and the springs $g$—$g$ are connected to the clamping or junction pieces $f$—$f$ and press the segments of the rings $c$—$c$ and the inner peripheries of the horizontal components of the pieces $f$—$f$ against the rod $b$. The stuffing box rings $e$—$e$ are of L-shape in section, but, instead of the horizontal flanges or members $h$—$h$ of the rings being plain as hitherto, the inner or lower faces of the flanges or members are formed with raised or projecting annular seats $j$—$j$ having extended flanges or rims $k$—$k$. The clamping or junction pieces $f$—$f$ of the packing rings $c$—$c$ bear against the annular seats $j$—$j$ and press the lower faces or ends of the packing rings firmly against the upper faces of the horizontal flanges or members $h$—$h$ of the stuffing box rings $e$—$e$, and the packing rings $c$—$c$ are thus caused to make good joints with the flanges or members $h$—$h$.

All the stuffing box rings may be formed with annular seats $j$—$j$, but preferably the first ring $v$ and the last ring $w$ are of ordinary or plain section. The raised or projecting seats $j$—$j$ strengthen the horizontal flanges or members $h$—$h$ of the stuffing box rings $e$—$e$ around their inner peripheries and prevent warping of the horizontal flanges or members which sometimes occurs under certain conditions with the ordinary or plain L-section rings, and the seats $j$—$j$ further enable the stuffing box rings $e$—$e$ to be readily withdrawn from the stuffing box $a$ by means of a suitable tool having a finger or the like adapted to engage behind the flanges or rims $k$—$k$.

The packing rings $c$—$c$ may be of any suitable form or construction that will admit of lateral play or movement of the rod $b$, and the rings are preferably made of material that will enable the rings to take advantage of the lubricating properties of the water or moisture condensed on the rod $b$ or in the chambers $d$—$d$ or expelled from the cylinder or the like. Any fluid leaking past one of the packing rings $c$—$c$ flows into the chamber $d$ in which the next packing ring is disposed and forces said ring against the rod $b$ and also against the upper face of the horizontal flange or member of the adjoining stuffing box ring $e$. The last packing ring may be provided with a beveled face $m$ for removing any condensation or moisture on the rod therefrom and conducting it to the chamber $d$ in which the packing ring is situated, whence it is led by a drain passage $n$. The last packing ring may also be provided with a collecting groove $o$ communicating with the chamber $d$ by passages $p$ and the grooves in which the springs $g$—$g$ lie.

$q$ is a ring of copper or other soft metal wire arranged between the neck bush $r$ and the first stuffing box ring $v$, and $s$ is a similar soft metal ring arranged between a closing ring $t$ and the gland $u$.

What I claim and desire to secure by Letters Patent is:—

1. In metallic packing for piston and like rods, the combination of a segmental packing ring fitted around and adapted to embrace the rod to be packed, a stuffing-box ring of L-shape in section inclosing said packing ring, a raised or projecting annular seat on the transverse or horizontal member or flange of said stuffing-box ring against which said packing ring bears, and an extended flange or rim on said annular seat.

2. In metallic packing for piston and like rods, the combination of a plurality of stuffing-box rings of L-shape in section, a segmental packing ring disposed in each of the chambers formed by said stuffing-box rings and fitted around and adapted to embrace the rod to be packed, a raised or projecting annular seat on the inner face of the transverse or horizontal member or flange of each of said stuffing-box rings for the packing ring inclosed therein, a seat on the outer face of each of said transverse or horizontal members or flanges for the packing ring inclosed within the adjoining stuffing-box ring and an extended flange or rim on each of said annular seats.

3. In metallic packing for piston and like rods a stuffing box ring inclosing a packing ring and comprising the combination of a vertical or axial flange or member, a horizontal or transverse flange or member, a raised or projecting annular seat on said horizontal or transverse flange or member, and an extended flange or rim on said annular seat.

In witness whereof I have hereunto signed my name in the presence of two subscribing witnesses.

RIDLEY COPELAND.

Witnesses:
EDMUND WARD PATTISON,
HERBERT HOWARD.